United States Patent [19]
Bobadilla et al.

[11] Patent Number: 5,638,255
[45] Date of Patent: Jun. 10, 1997

[54] POWER PROTECTION AND DISTRIBUTION MODULE

[75] Inventors: Omar J. Bobadilla, Parsippany; Andy Y. Ng, Edison, both of N.J.

[73] Assignee: Lucent Technologies Inc., Murray Hill, N.J.

[21] Appl. No.: 572,945

[22] Filed: Dec. 15, 1995

[51] Int. Cl.$^6$ .................................................. H02B 1/26
[52] U.S. Cl. .......................... 361/624; 361/725; 361/730; 361/734
[58] Field of Search ............................... 361/600, 602, 361/611, 614, 622, 624–626, 636, 725, 727, 729, 730, 734, 753, 763, 830, 831

[56] References Cited

U.S. PATENT DOCUMENTS

| | | | |
|---|---|---|---|
| 2,542,853 | 2/1951 | Wills | 361/624 |
| 4,305,114 | 12/1981 | Takagi et al. | 361/614 |
| 4,502,097 | 2/1985 | Takahashi | 361/614 |
| 4,567,544 | 1/1986 | Ronemus et al. | 361/753 |
| 4,831,489 | 5/1989 | Ozu et al. | 361/614 |

*Primary Examiner*—Gregory D. Thompson

[57] ABSTRACT

A module for an equipment rack in a wireless communication system wherein the functions of power filtering, distribution, and limitation are integrated into a single module whose wiring is both simplified and standardized. The module comprises a filtering capacitor and several circuit breakers which are arranged in parallel with a busbar providing the filtered current. The tripping current of each circuit breaker is set to safely provide power to a branch circuit of the equipment rack which the module serves. A terminal in the rear of the module connects it to the rack as the module is inserted. The replacement module has the same quality control standard as the rest of the equipment and the down time of the wireless system network is reduced.

9 Claims, 5 Drawing Sheets

POWER PROTECTION AND DISTRIBUTION MODULE

BACKGROUND OF THE INVENTION

1. Field of the Invention

This invention relates to a module for the distribution of power and the protection of circuits which receive that power. The module is particularly adapted to plug into an equipment rack within a cellular wireless communication system.

2. Description of Related Art

The rapid growth in communications systems is characterized by increased bandwidth in systems which are distributed by cables and optical fibers and also by the advent of wireless systems which provide access to a network anywhere within a cell of the network. Competitive pressures force the evolution of low-cost high-volume equipment without any sacrifice in accessibility to the network due to equipment failures.

The power distribution network for equipment racks in wireless systems have used filters and circuit breakers which were wired in place. The circuit breakers were attached on one side to a common source and they distribute current in limited quantities to several branch circuits in the equipment rack. The filter was a capacitor which removed voltage transients from the input power line. If a capacitor failed or if a circuit breaker failed to operate within specification, the whole rack was out of service. The result was considerable downtime for the system, increased labor to isolate and repair the fault on-site, and a repair which might have less reliability than a factory standard rack.

Accordingly, there is an increased need to integrate the functions of the filter and that of power limitation and distribution so that wiring is reduced, and maintenance recovery time is improved. It is also desirable to conduct repairs at a less critical time, and back at the factory where quality control standards, diagnostic testing, and labor costs are better controlled.

SUMMARY OF THE INVENTION

The present invention relates to a power protection and distribution module for a cellular wireless system. A housing is formed from a base, and front panel and rear panels which are attached to the base. A connector housing, having a series of pins, is supported by and penetrates the rear panel. One or more circuit breakers, each one having a line side terminal and a load side terminal, are supported by and penetrate the front panel. A capacitor, having a positive terminal and a negative terminal is in parallel with the input power and filters voltage spikes and shunts them to ground. A common busbar interconnects the negative terminal of the capacitor to several pins of the connector housing. A ground lead connects a negative pin in the connector housing to the common busbar (or the negative pin of the capacitor). A line side bus bar connects the positive terminal of the capacitor to the line side terminal of each circuit breaker, and a power lead connects a positive pin of the connector housing to the line side bus bar. A load side bus bar, having at least one current path, connects the load side terminal of each circuit breaker to a distinct pin in the connector housing so that a distinct value of current is provided to each branch circuit being served by the module. The module and its connector housing are adapted to engage a mating connector housing as the module is inserted into an equipment rack.

In another embodiment of the invention, wires interconnect a positive pin in a connector housing to a positive terminal of a capacitor and line side terminals of each circuit breaker. The load side terminals of each circuit breaker are each wired to a distinct pin in the connector housing. Wires also interconnect the negative terminal of the capacitor to negative pins in the connector housing. Various shunting arrangements are used to simplify the wiring to the negative pins.

These and other features and advantages of the invention will be better understood with consideration of the following detailed description of the preferred embodiments taken in conjunction with the accompanying drawings.

The drawings are not to scale.

DETAILED DESCRIPTION OF THE PREFERRED EMBODIMENTS

Figure 1:
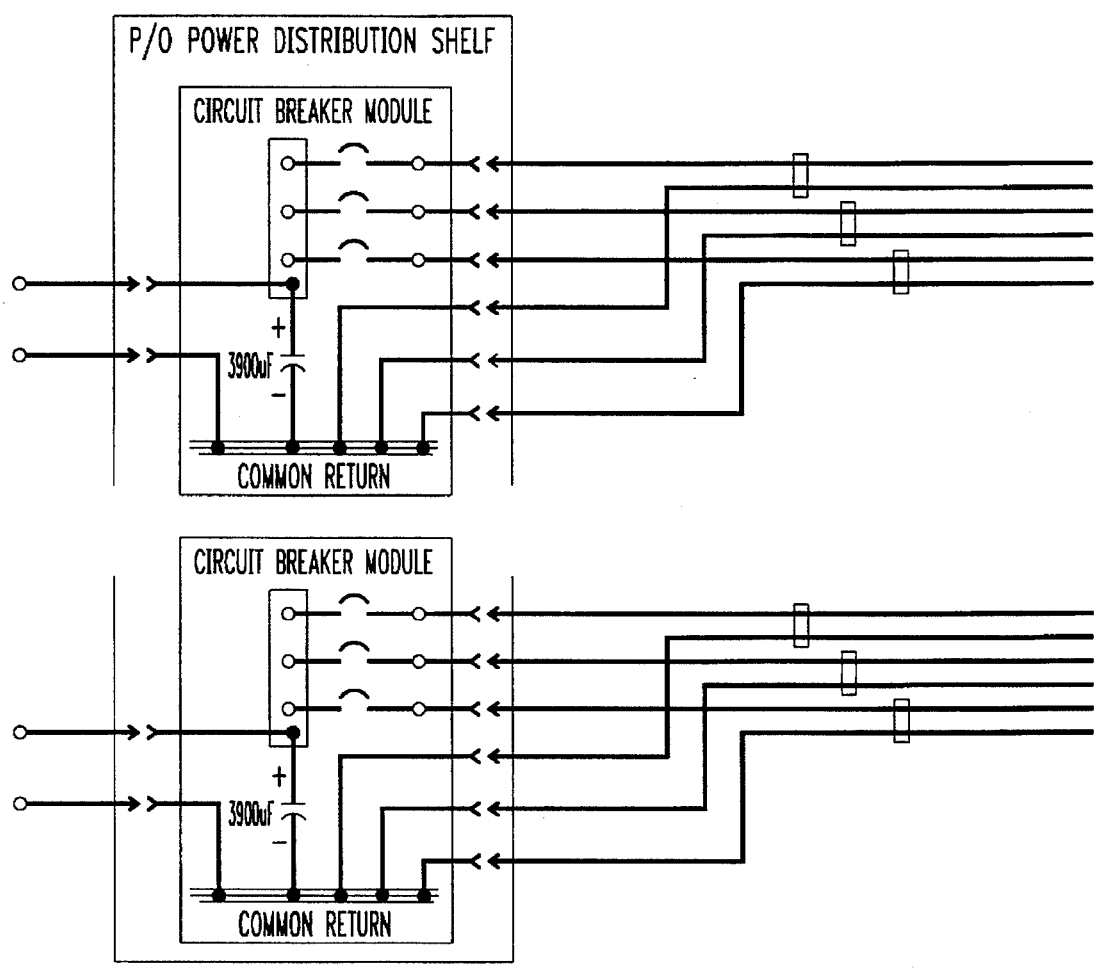
FIG. 1 is a block diagram of the circuitry of the invention.

Referring now to FIG. 1, there is shown a connector housing which provides input power to a power protection and distribution module. A capacitor in parallel with the input line filters any power spikes on the line by shunting them to ground. The line sides of several circuit breakers, with tripping currents ranging from 0.5 amperes to 30 amperes, are connected to the positive side of the input power at a common supply. The return from each load is connected to the negative side of the input power at a common return. The loads, which are not shown, are various amplifiers, and fans. This circuit, therefore, filters the power with the capacitor, distributes the power by the parallel arrangement of the circuit breakers, and limits the power by the value of the current permitted to pass through each circuit breaker.

Figure 2:
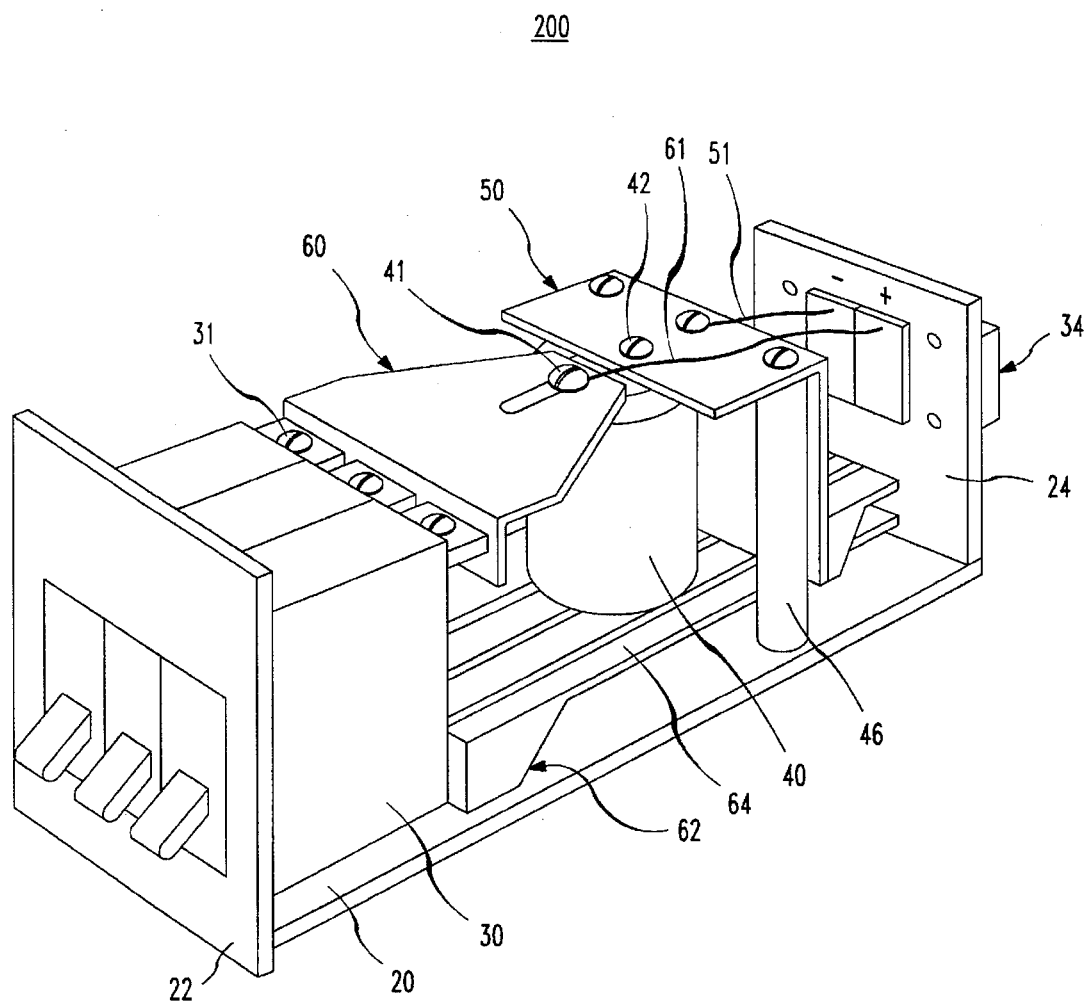
FIG. 2 is an isometric view of one embodiment of the invention.
Figure 3:
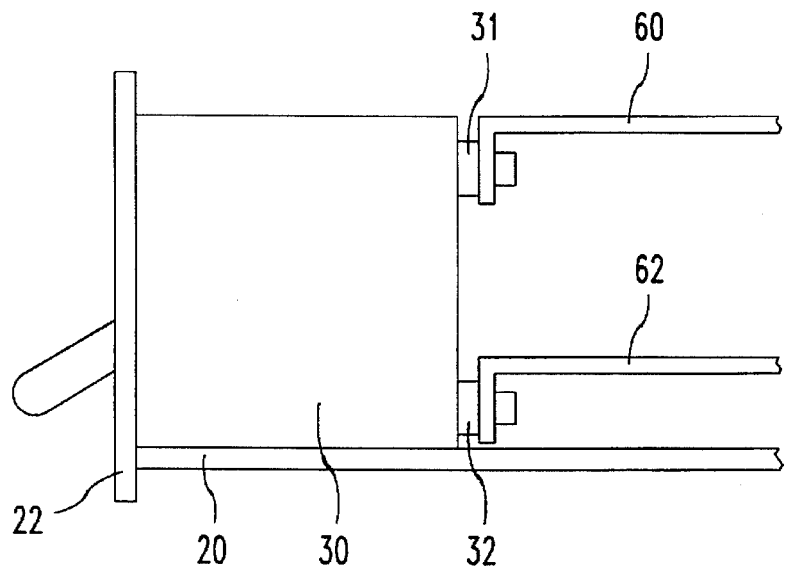
FIG. 3 is a side view of a portion of one embodiment of the invention.
Figure 4:
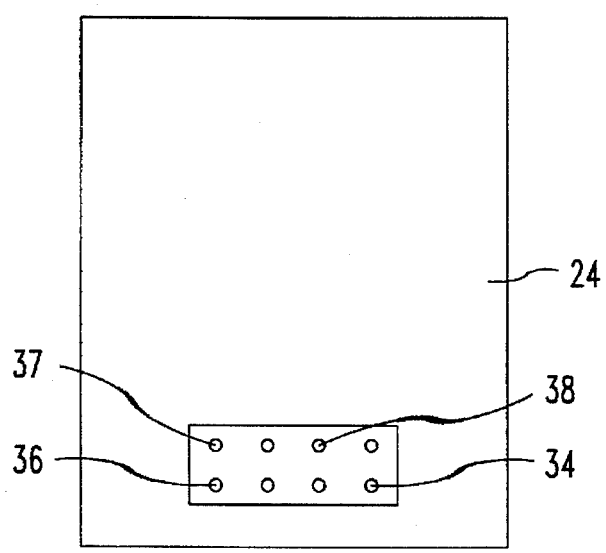
FIG. 4 is a rear view of one embodiment of the invention.

Referring now to FIG. 2, FIG. 3, and FIG. 4 there is shown apparatus 200 which is a power protection and distribution module adapted for insertion into an equipment rack, more specifically, an equipment rack for a cellular wireless communication system. A rectangular base 20 supports front panel 22 and rear panel 24 to form a housing. The front panel supports at least one circuit breaker 30, the switch of which penetrates the front panel through an aperture defined therein. Each circuit breaker has a line side terminal 31 and a load side terminal 32. When the current passing in series through these terminals exceeds a distinct value which is designated for each circuit breaker, the circuit breaker reacts and the connection between the terminal is opened. The design and operation of circuit breakers are well known in the art. The rear panel supports at least one connector housing 34, having a series of pins 38 (or receptacles) which are adapted to mate with a corresponding receptacle (or pin) in a connector housing on an equipment rack (not shown) into which the module is inserted. The pins on the connector housing are designated to provide inputs of line side power and ground, and outputs of ground and various load side power from the module. A capacitor 40, having a positive terminal 41 and a negative terminal 42, is supported by the base through standoff 46 and common busbar 50 which is connected to a ground pin 36 on the connector housing by ground lead 51. The common busbar is also connected to the negative terminal of the capacitor and to various ground pins in the connector housing. The positive terminal of the capacitor is connected to line side busbar 60 which is also connected to a positive, power supplying pin 37, in the connector housing block by power lead 61. The line side busbar supplies current to each line side terminal of the circuit breakers. The load side terminal of each circuit breaker is connected to load side busbar 62, which is typically a printed wiring board having a multiplicity of conductor paths, each path of which connects a load side terminal to a pin in the connector housing.

Figure 5:
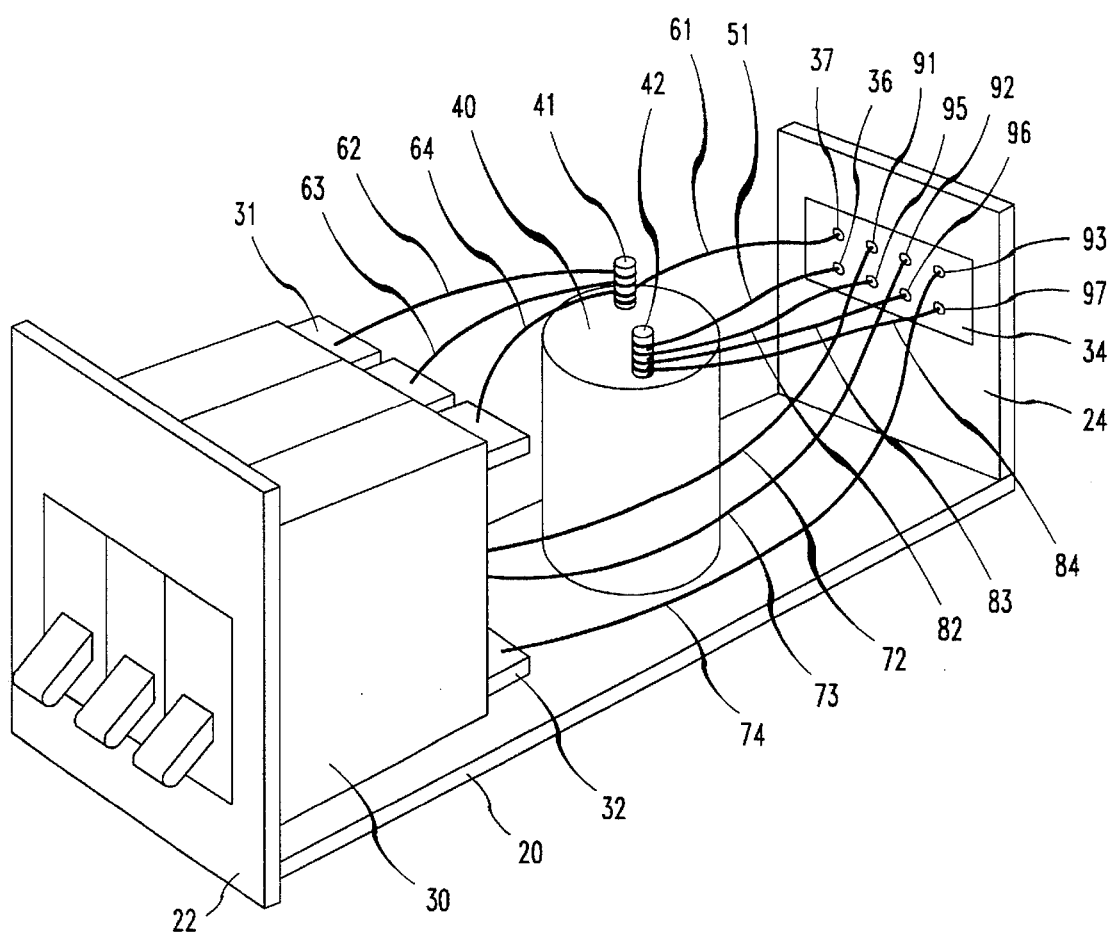
FIG. 5 is an isometric view of another embodiment of the invention.

Referring now to FIG. 5, there is shown apparatus 500 which is another embodiment of the same invention wherein elements identified with the same numbers as elements in FIG. 2 are the same and serve the same function. In this embodiment, power lead 61 connects positive terminal 41 of capacitor 40 to power supplying pin 37 in connector housing 34. Ground lead 51 connects ground pin 36 in the connector housing to negative terminal 42 of the capacitor. Wires 62, 63, and 64 connect the positive terminal of the capacitor to a line side terminal 31 of each circuit breaker 30. Load side terminal 32 of each circuit breaker is connected to power supplying pins 91, 92, and 93 by wires 72, 73, and 74, respectively. The negative terminal of the capacitor is connected to ground pins 95, 96, and 97 by wires 82, 83, and 84, respectively.

Figure 6A:
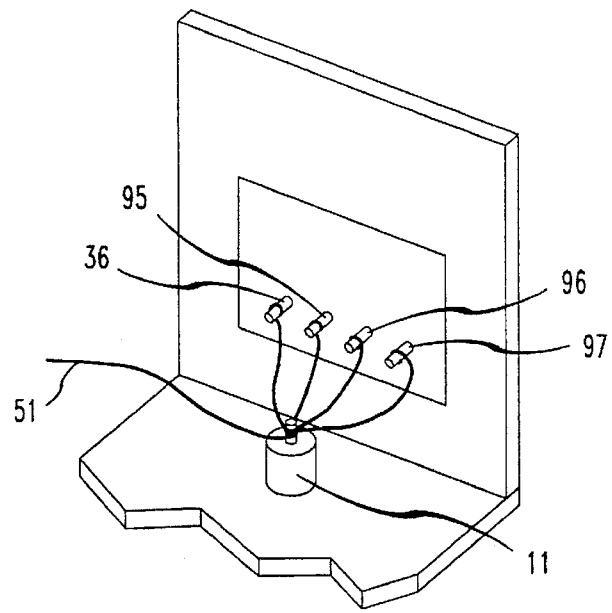
FIG. 6A, FIG. 6B and FIG. 6C is an isometric view of alternative wiring arrangements which interconect pins in a connector housing in another embodiment ofhte invention.
Figure 6C:
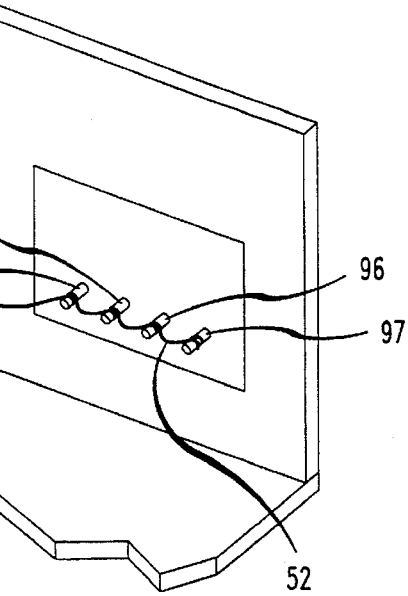
Figure 6B:
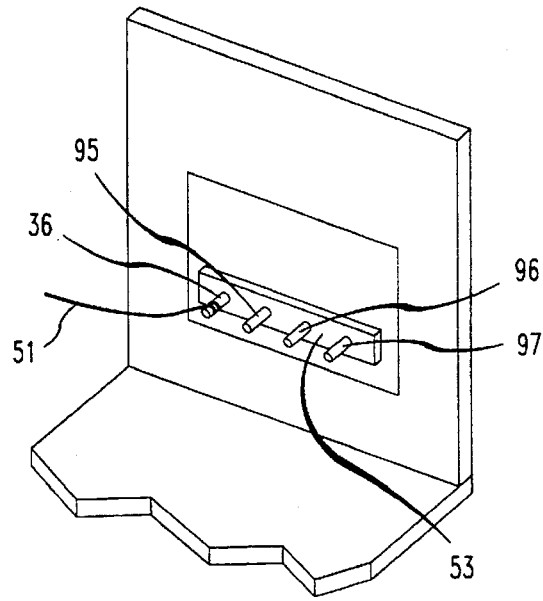

Referring now to FIG. 6A, FIG. 6B and FIG. 6C there are shown alternative wiring arrangements wherein ground pins 95, 96, and 97 are connected to ground pin 36 by shunt 52. Ground lead 51 connects the aforementioned ground pins to negative terminal 42 of capacitor 40 in FIG. 5. Shunt 52 may be a wire or a bar 53 mounted to the connector housing. A terminal 11 supported by the module may also provide a common point of connection for shunts 52 from the ground pins and to the capacitor's negative terminal.

In operation, the capacitor, which may range from 10 to 4000 microfarads, filters power spikes in the current entering the module and shunts them to the common bus bar which is at ground potential. Each circuit breaker is set to react (open) at a distinct, and safe, value of current. The module thereby shunts power spikes, limits the direct current value in a multiplicity of circuits, and provides a common ground to minimize common line impedances and thereby eliminate series ground connections from noise and voltage transient standpoints.

In a preferred embodiment, the capacitor value is 3900 microfarads and it is supplied by United Chemicon, Inc. The circuit breakers are supplied by the Airpax Division of Phillips Technologies, and they all have the same overall dimensions, but may be selected with various tripping currents to meet the safety requirements of the several branch circuits in the equipment rack. The connector housing is supplied by AMP Inc., wherein the input power and distributed power pins are within a common housing. The overall dimensions of each module are 3.0 inches high, 2.646 inches wide, and 6.5 inches long. Eight modules are placed side by side, 2.927 inches on center, in a nominal 24 inch wide equipment rack.

The advantages of this structure are that the functions of power filtering, distribution, and limitation are integrated into a single module whose wiring is both simplified and standardized. The module reduces assembly costs in the factory and improves reliability by eliminating many hand-wired connections. If a component failure occurs in service, the module is much more quickly replaced than the former attempts to troubleshoot the exact location of the failure and to repair it in the field. The replacement module has the same quality control standard as the rest of the equipment, whereas field repairs are less reliable and infrequently documented. The defective component in the replaced module may be more easily diagnosed and repaired at the factory with standardized test equipment and specifically trained personnel. Most importantly, the down time of the wireless system network is reduced.

Changes and modifications in the specifically described embodiments can be carried out without departing from the scope of the invention. In particular, a pin may be used for a receptacle, and vice versa, fuses may be used in place of circuit breakers, and the capacitor may be supported directly by the frame or via a standoff or printed wiring board connected to the frame. The connection between the circuit breakers and the bus bars or wires may be made by any fastening device, such as a screw-type connection, a push-on terminal, or a soldered terminal.

We claim:

1. A power protection and distribution module comprising:
   a connector housing having a series of pins;
   a capacitor having a positive and a negative terminal;
   a common busbar interconnecting the negative terminal of the capacitor to several pins of the connector housing;
   a line side busbar being connected to the positive terminal of the capacitor and to a positive pin of the connector housing;
   at least one circuit breaker, having a load side terminal and a line side terminal which is connected to the line side busbar; and
   a load side bus bar, comprising at least one electrical path, connecting the load side terminal of each circuit breaker to a distinct pin in the connector housing.

2. The module of claim 1 further comprising a housing whose rear panel supports the connector housing and whose front panel supports the circuit breaker.

3. The module of claim 1 further comprising a ground lead connecting a negative pin of the connector housing to the common busbar.

4. The module of claim 1 further comprising a power lead connecting a positive pin of the connector housing to the line side bus bar.

5. The module of claim 1 wherein each circuit breaker in the module is set to react at a distinct value of current and the connector housing is adapted to engage a mating connector housing as the module is inserted into an equipment rack.

6. A power protection and distribution module for a cellular wireless system comprising:
   a housing comprising a base, a front panel supported by the base, and a rear panel supported by the base;
   at least one connector housing, having a series of pins, supported by and penetrating the rear panel;
   at least one circuit breaker, having a line side terminal and a load side terminal, supported by and penetrating the front panel;
   a capacitor, having a positive terminal and a negative terminal, supported by the base;
   a common busbar interconnecting the negative terminal of the capacitor to several pins of the connector housing;

a ground lead connecting a negative pin in the connector housing to the common busbar;

a line side bus bar connecting the positive terminal of the capacitor to the line side terminal of each circuit breaker;

a power lead connecting a positive pin in the connector housing to the line side bus bar; and a load side bus bar, comprising at least one electrical path, connecting the load side terminal of each circuit breaker to a distinct pin in the connector housing;

wherein each circuit breaker in the module may be set to react at a distinct value of current and the connector housing is adapted to engage a mating connector housing as the module is inserted into an equipment rack.

7. A power protection and distribution module for a cellular wireless system comprising:

a housing comprising a base, a front panel supported by the base, and a rear panel supported by the base;

at least one connector housing, having a series of pins, supported by and penetrating the rear panel;

at least one circuit breaker, having a line side terminal and a load side terminal, supported by and penetrating the front panel;

a capacitor, having a positive terminal and a negative terminal, supported by the base;

a power lead connecting a positive pin in the connector housing to the positive terminal of the capacitor;

a series of wires connecting the load side terminal of each circuit breaker to distinct pin in the connector housing, respectively; and a series of wires connecting the negative terminal of the capacitor to a series of ground pins in the connector housing;

wherein each circuit breaker in the module is set to react at a distinct value of current and the connector housing is adapted to engage a mating connector housing as the module is inserted into an equipment rack.

8. The power protection and distribution module of claim 7 further comprising a bar which interconnects at least two negative pins in the connector housing.

9. The power protection and distribution module of claim 7 further comprising wires entering a terminal which interconnect at least two negative pins in the connector housing to the negative terminal of the capacitor.

* * * * *